(12) United States Patent
Dray et al.

(10) Patent No.: US 11,995,489 B2
(45) Date of Patent: May 28, 2024

(54) COMMUNICATION CARD AND SYSTEM WITH COMMUNICATION CARD AND BOX

(71) Applicant: EATON INTELLIGENT POWER LIMITED, Dublin (IE)

(72) Inventors: Alexandre Dray, Crolles (FR); Anthony Askamp, Grenoble (FR); Sebastien Sebastien Ocquidant, Meylan (FR)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/996,301

(22) PCT Filed: Apr. 14, 2021

(86) PCT No.: PCT/EP2021/059662
§ 371 (c)(1),
(2) Date: Oct. 14, 2022

(87) PCT Pub. No.: WO2021/213859
PCT Pub. Date: Oct. 28, 2021

(65) Prior Publication Data
US 2023/0196049 A1    Jun. 22, 2023

(30) Foreign Application Priority Data
Apr. 20, 2020 (GB) .................................... 2005680

(51) Int. Cl.
*G06K 19/07*    (2006.01)
*G06K 19/077*    (2006.01)

(52) U.S. Cl.
CPC ... *G06K 19/0709* (2013.01); *G06K 19/07773* (2013.01)

(58) Field of Classification Search
CPC .................... G06K 19/0709; G06K 19/07773
USPC ......................................................... 235/492
See application file for complete search history.

(56) References Cited

U.S. PATENT DOCUMENTS

| | | | |
|---|---|---|---|
| 6,778,096 B1 | 8/2004 | Ward et al. |
| 2005/0037707 A1 | 2/2005 | Lewis |
| 2008/0041930 A1 | 2/2008 | Smith et al. |
| 2010/0044444 A1 | 2/2010 | Jain et al. |
| 2014/0329467 A1 | 11/2014 | Ewing et al. |
| 2015/0199546 A1 | 7/2015 | Sato |
| 2016/0148188 A1 | 5/2016 | Jain et al. |

FOREIGN PATENT DOCUMENTS

EP     2199946 A1    6/2010

*Primary Examiner* — Daniel A Hess
(74) *Attorney, Agent, or Firm* — LEYDIG, VOIT & MAYER, LTD.

(57) ABSTRACT

A communication card comprises an antenna, a memory, a signal evaluation circuit, an energy supply circuit, a data interface, a signal processing circuit and a supply voltage terminal. The supply voltage terminal is coupled to the signal processing circuit and the memory. In a commissioning phase, the energy supply circuit is configured to receive electrical power via the antenna and provide electrical power to the signal evaluation circuit and the memory, and the signal evaluation circuit is configured to receive configuration data via the antenna and to store the configuration data in the memory. In an operating phase, the communication card is configured to receive electrical power by the supply voltage terminal, and the signal processing circuit is configured to read the configuration data stored in the memory.

15 Claims, 4 Drawing Sheets

COMMUNICATION CARD AND SYSTEM WITH COMMUNICATION CARD AND BOX

The disclosure relates to a communication card, an arrangement with a communication card and a system with a communication card and a box.

A communication card comprises a data interface, a memory and a signal processing circuit coupled to the memory and to the data interface. Moreover, the communication card typically comprises a supply voltage terminal for providing electric power to the signal processing circuit and the memory. For providing configuration information to the communication card, a human machine interface such as, for example, dual-inline-package switches, abbreviated as DIP switches, can be used. Such a communication card is typically delivered in a box to a customer.

Document US 2016/0148188 A1 describes a switching between internal and external antennas. A transaction card includes an interface and an antenna on a resilient member. The transaction card may be implemented in accordance with an intelligent card. The intelligent card comprises a central processing unit which is coupled to an antenna and to a memory. The transaction card may be passive and powered from an induction magnetic field generated by a point of sale. In some implementations, a transaction card may be implemented in the form of a self-contained desktop standalone unit powered by an external AC adapter.

Document US 2014/0329467 A1 refers to a power distribution unit which includes a communication module. The communication module comprises an antenna, a memory, a network processor and a power supply. The antenna is used for communication.

Document US 2010/0044444 A1 is related to amplifying radio frequency signals.

It is an object to provide a communication card, an arrangement with a communication card and a system with a communication card and a box which allow an easy configuration of the communication card.

This object is achieved by the subject-matter of the independent claims. Further developments and embodiments are described in the dependent claims.

In an embodiment, a communication card comprises an antenna, a memory, a signal evaluation circuit, an energy supply circuit, a data interface, a signal processing circuit and a supply voltage terminal. The memory is realized as a non-volatile memory. The signal evaluation circuit is coupled to the antenna and to the memory. The energy supply circuit is coupled to the antenna for receiving electrical power from the antenna and is coupled to the signal evaluation circuit and the memory for providing electrical power to the signal evaluation circuit and the memory. The signal processing circuit is coupled to the data interface and to the memory. The supply voltage terminal is coupled to the signal processing circuit and to the memory for providing electrical power to the signal processing circuit and the memory.

Advantageously, the antenna is coupled via the energy supply circuit to the signal evaluation circuit and the memory. The energy supply circuit is configured to generate electrical power for the signal evaluation circuit and the memory using an electromagnetic signal received by the antenna. Thus, the communication card can receive data such as configuration data via the antenna.

In an embodiment, in a commissioning phase, the energy supply circuit receives electrical power via the antenna and provides electrical power to the signal evaluation circuit and the memory. In the commissioning phase, the signal evaluation circuit receives configuration data via the antenna and stores the configuration data in the memory.

In an embodiment, default data are stored in the memory. The default data or a part of the default data may be overwritten by specific data in the commissioning phase.

In an embodiment; an operating phase or several operating phases may follow the commissioning phase. Optionally, there may a period between the close of the commissioning phase and a start of the operating phase. The operating phase may not directly follow or may directly follow the commissioning phase.

In an embodiment, in the operating phase, the communication card receives electrical power by the supply voltage terminal. In the operating phase, the signal processing circuit reads the configuration data stored in the memory.

In an embodiment, the communication card is free of a human machine interface.

In an embodiment, the antenna is implemented as a short-range wireless technology antenna, for example as near-field-communication antenna, abbreviated NFC antenna. The antenna may be configured for a short-range wireless technology.

In an embodiment, the antenna is implemented as antenna for a wireless personal area network (abbreviated WPAN). The WPAN may be implemented as Bluetooth, ZigBee or Wi-Fi.

In an embodiment, the antenna is realized as a one of a group comprising a loop antenna, a coil antenna, a dipole antenna and a monopole antenna.

The communication card may be configured for a short-range wireless communication, e.g. for NFC communication.

In an embodiment, the communication card comprises a NFC connected tag. The antenna, the memory, the signal evaluation circuit and optionally further circuit parts form the tag.

In an embodiment, the energy supply circuit is configured for energy harvesting of energy provided by the antenna.

In an embodiment, the signal evaluation circuit is configured for data decoding of signals provided via the antenna to the signal evaluation circuit and for data encoding of signals provided from the signal evaluation circuit to the antenna.

In an embodiment, the communication card comprises a printed circuit board and a panel. The panel is mechanically and electrically connected to the printed circuit board. The antenna is located at the panel. At least the data interface, the signal processing circuit and the supply voltage terminal are located at the printed circuit board. The panel may be a front panel, a rear panel or a side panel.

The data interface may be realized e.g. as a RS232 interface, RS485 interface and/or CAN interface.

In an embodiment, the communication card comprises a further interface that is realized as communication interface. The further interface is coupled to the signal processing circuit. The further interface is located at the panel. The further interface may be additionally coupled to the supply voltage terminal.

The further interface may be an Ethernet interface, a universal-serial-bus interface (abbreviated USB interface) and/or a RS485 interface.

In an embodiment, the communication card is configured as an interface card. The further interface and the data interface may use different communication standards. The signal processing circuit is configured to convert a data signal received at one interface of the further interface and the data interface into a data signal provided to the other interface of the further interface and the data interface.

In an embodiment, the printed circuit board of the communication card has four edges, a top side and a bottom side. The panel of the communication card is mechanically connected to a first edge of the printed circuit board. The data interface and the supply voltage terminal may be located e.g. at a second edge of the printed circuit board. The second edge is opposite to the first edge of the printed circuit board.

In an embodiment, the communication card does not receive electrical power in the commissioning phase by the supply voltage terminal and receives electrical power in the operating phase by the supply voltage terminal.

In an embodiment, the configuration data include at least one data of a group comprising network description data, network identification data, internet-protocol address (abbreviated IP address) and host name. The network description data provide information about the kind of network to which the communication card is connected to in the operating phase (e.g. via the data interface and/or the further interface).

The network identification data are used by the communication card to identify itself in the network to which the communication card is connected in the operating phase (e.g. via the data interface and/or the further interface). The configuration data are the data that are essential for the beginning of the operating phase. Advantageously, the configuration data are stored in the memory of the communication card before powering via the supply voltage terminal.

The configuration data may include one network parameter or more than one network parameter.

In an embodiment, the operating phase includes a configuration phase. In the configuration phase, the communication card uses the network description data and network identification data to identify itself in the network and to receive e.g. software or software updates or other data required for operation via the network.

In an alternative embodiment, the communication card may optionally receive electrical power in the commissioning phase and in the operating phase by the supply voltage terminal.

In an embodiment, the signal processing circuit is configured to store data in the memory in an operating phase. The signal evaluation circuit is configured to provide the data via the antenna in an evaluation phase that follows the operating phase. The evaluation phase may be an error checking phase. The communication card receives electrical power in the operating phase by the supply voltage terminal and does not receive electrical power in the evaluation phase by the supply voltage terminal. The communication card receives electrical power in the evaluation phase by the antenna. The signal processing circuit may be idle in the evaluation phase.

Advantageously, data can be retrieved from the communication card and/or the arrangement including the communication card, when the communication card and/or the arrangement is off and/or damaged. The data is e.g. retrieved without providing power to the communication card via the supply voltage terminal.

In an embodiment, the communication card comprises a further memory. The further memory is coupled to the signal processing unit and to the supply voltage terminal. The further memory may include at least a volatile memory part. The further memory may include at least a non-volatile memory part.

In an embodiment, an arrangement comprises the communication card. The arrangement may be any equipment using a communication card. The arrangement is e.g. one of a group comprising an uninterruptable power supply, abbreviated UPS, and a power distribution unit, abbreviated PDU. The communication card is inserted into a slot of the arrangement. The arrangement may be implemented as equipment.

In an embodiment, the arrangement may comprise a front side, a rear side and several further sides such as e.g. a left side, right side, top side and bottom side. The communication card, comprising the printed circuit board and the panel, is inserted in one of the sides of the arrangement. In case the communication card is inserted into the front side of the arrangement, the panel is realized as front panel. In case the communication card is inserted into the rear side of the arrangement, the panel is realized as rear panel. Correspondingly, the panel may be implemented as left side panel, right side panel, top side panel and/or bottom side panel.

The arrangement is configured such that the communication card can be inserted into the arrangement.

In an embodiment, the communication card is configured as plug-in card.

In an embodiment, the arrangement may comprise a rack that comprises the slot for inserting the communication card.

In an embodiment, a power supply of the arrangement is connected to the supply voltage terminal of the communication card for supplying electrical power to the communication card. A data interface of the arrangement is connected to the data interface of the communication card.

In an embodiment, a system comprises the communication card and a mobile device with a further antenna. The mobile device may be named handheld computer or mobile computer. The mobile device may be realized e.g. as a smartphone, a tablet computer, a handheld personal computer, a laptop, a personal digital assistant, an enterprise digital assistant and/or a portable data terminal.

In an embodiment, the antenna of the communication card is aligned to the further antenna of the mobile device. The antenna is close to the further antenna. A center of the antenna is aligned to a center of the further antenna. Thus, the arrangement of the antenna to the further antenna is configured to allow a communication and an electrical power transfer between the further antenna and the antenna.

The mobile device may communicate with the communication card via NFC and/or wireless personal area network (abbreviated WPNA, such as Bluetooth, ZigBee or Wi-Fi).

In an embodiment, the system realizes a wireless and unpowered commissioning procedure for a packaged electronic communication card or a communication card already installed in an equipment or arrangement.

Features and embodiments that are only described in connection with the communication card may also be implemented in connection with the arrangement or the system and vice versa.

In an embodiment, a box comprises an outer housing, a mark at a location at an outer side of the outer housing, and at least a separator inside the outer housing. The separator is configured such that a communication card can be inserted into the box. The separator is configured such that an antenna of the communication card is arranged in vicinity to the mark. For example, the mark may be printed on the outer housing, may be embossed or may be stamped on the outer housing or may be glued on the outer housing as a label. The mark may be named marking. A distance of the antenna to an outside of the outer housing may be less than a predetermined value. The distance may be out of the range 2 mm to 5 cm or alternatively 2 mm to 3 cm or alternatively 5 mm to 2 cm.

The communication card may be a card as described above or may be another example of a communication card.

In an embodiment, the box comprises the communication card.

Alternatively, the box may be free of the communication card. The box may only be prepared to receive a printed circuit board and a panel with an antenna.

In an embodiment, the outer housing is made out of non-conductive material e.g. as paperboard or polymer.

The separator or separators may be realized as a spacer or insert.

In an embodiment, the separator or the separators are made out of non-conductive material, e.g. paperboard or polymer. For example, the separator or the separators may be realized as at least one paperboard part, at least one air cushion and/or a foamed polystyrene insert.

In an embodiment, the box is fabricated as card box, cardboard box, folding box or polymer housing.

In an embodiment, a bundle box comprises a first number N of boxes. The first number N is larger than 1. Each of the first number N of boxes comprises a mark. Thus, the bundle box comprises a first number N of marks.

In an embodiment, the bundle box comprises a first number N of communication cards, each having an antenna.

In an embodiment, the communication card comprises an energy supply circuit, a memory and a signal evaluation circuit. In a commissioning phase, the energy supply circuit receives electrical power via the antenna through the outer housing and provides electrical power to the signal evaluation circuit and the memory. The signal evaluation circuit receives configuration data via the antenna through the outer housing and stores the configuration data in the memory.

Thus, the commissioning is done or can be done through the box or through each box of the bundle box. User locates the antenna of the communication card without opening the box due to the mark or marking and aligns phone antenna with the antenna of the communication card, e.g. maximizing energy transfer and preventing the data transfer to an undesired communication card. In case of the bundle box, user locates the antenna of one of the communication cards without opening any box due to the marks or markings and aligns the phone antenna with the antenna of this communication card, e.g. maximizing energy transfer and preventing the data transfer to an undesired communication card.

Features and embodiments that are only described in connection with the communication card, the system or the arrangement may also be implemented in connection with the box or the bundle box and vice versa.

In an embodiment, integrators and/or end customers can perform some early commissioning of the communication card, in particular to configure its basic network parameters also in case the communication card is in the box, in the bundle box or in the arrangement which is not connected to the regular power supply.

In an embodiment, designing and integrating the NFC antenna on the front, rear or side panel of the communication card allow indifferently an indirect wireless commissioning (indirect because the communication card is still in its cardboard box and not visible to the customer) or a direct wireless commissioning of the communication card (the communication card is already installed in the hosting equipment, e.g. a UPS, and is accessible) from a mobile device (e.g. smartphone or tablet computer). The commissioning of the communication card is possible even if the communication card is unpowered thanks to the NFC energy harvesting.

In an embodiment, the communication card, antenna and packaging design addresses two commissioning use cases. The customer can perform the commissioning without unboxing the communication card. This results in time saving and very early commissioning. The NFC commissioning permits energy harvesting which enables an unpowered commissioning e.g. of the communication card inserted into the arrangement: This results also into time saving and in less infrastructure needed during the commissioning.

In an embodiment, the communication card is configured for wireless commissioning still in its original packaging (without unboxing). The internal design of the packaging (use of one separator or of separators) and the target printed on the outer envelope allow a good alignment of the antenna present on the communication card and of the antenna of the mobile device used by the customer (blind commissioning). The internal design of the packaging (use of separators or spacers) results in an antenna-to-antenna distance in accordance with the relevant standard which is e.g. the near-field-communication standard, abbreviated NFC standard.

In an embodiment, the commissioning can be performed even if the unit packages or boxes are grouped together in a bundle box. In this case, there are as many marks or targets printed on the visible side of the bundle box as there are unit packages or boxes bundled within the package.

The following description of figures of embodiments shall further illustrate and explain aspects of the communication card, arrangement with communication card, box and bundle box. Parts and components with the same structure and the same effect, respectively, appear with equivalent reference symbols. Insofar as parts and components correspond to one another in terms of their function in different figures, the description thereof is not repeated for each of the following figures.

Figure 1:
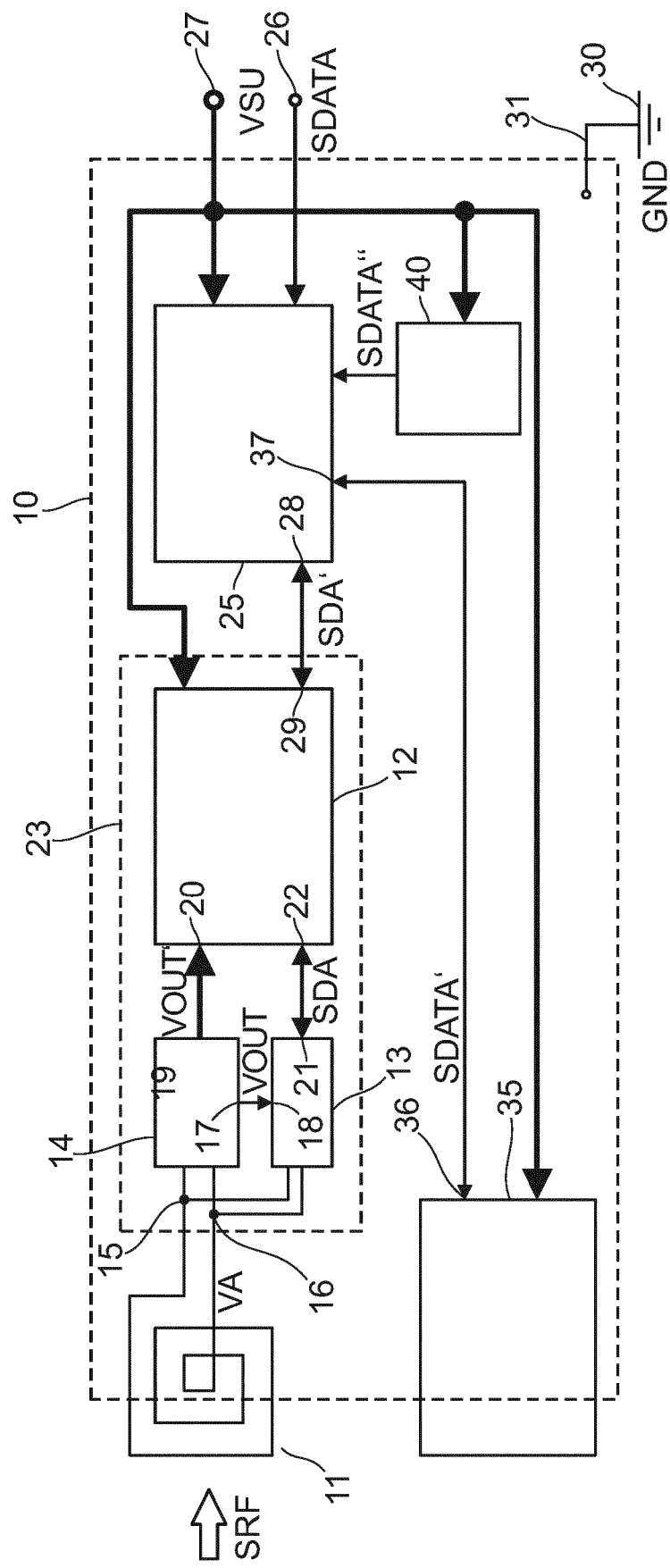
FIG. 1 shows an exemplary embodiment of a communication card.

FIG. 1 shows an exemplary embodiment of a communication card 10, abbreviated as "card". The card 10 comprises an antenna 11, a memory 12, a signal evaluation circuit 13 and an energy supply circuit 14. The antenna 11 is coupled to the energy supply circuit 14 and to the signal evaluation circuit 13. The energy supply circuit 14 is coupled to the signal evaluation circuit 13 and to the memory 12. The signal evaluation circuit 13 is coupled to the memory 12. The antenna 11 is realized as a coil antenna. The coil antenna may be fabricated as a tuned coil. The antenna 11 may be implemented as a loop antenna. Thus, the antenna 11 comprises two terminals 15, 16. The two terminals 15, 16 of the antenna 11 are connected to two inputs of the energy supply circuit 14. Moreover, the two terminals 15, 16 of the antenna 11 are connected to two terminals of the signal evaluation circuit 13.

A supply output 17 of the energy supply circuit 14 is connected to a supply input 18 of the signal evaluation circuit 13. A further supply output 19 of the energy supply circuit 14 is connected to a supply input 20 of the memory 12. A data terminal 21 of the signal evaluation circuit 13 is connected to a data terminal 22 of the memory 12. Optionally, a bus line may connect the data terminal 22 of the memory 12 to the data terminal 21 of the signal evaluation circuit 13.

The antenna 11 is implemented as a NFC antenna. The energy supply circuit 14 may be realized as an energy harvester circuit. The signal evaluation circuit 13 is realized as a data encoder/decoder. The signal evaluation circuit 13 may include a tag logic, e.g. a NFC forum tag logic. The memory 12 is fabricated as a non-volatile memory. For example, the memory 12 may be fabricated as an electrically erasable programmable read-only memory, abbreviated EEPROM, or as a flash memory. The memory 12, the signal evaluation circuit 13 and the energy supply circuit 14 are arranged on a part 23 or portion of the card 10.

Moreover, the card 10 comprises a signal processing circuit 25, a data interface 26 and a supply voltage terminal 27. The signal processing circuit 25 is coupled to the memory 12. More specifically a data terminal 28 of the signal processing circuit 25 is connected to a data terminal 29 of the memory 12. The supply voltage terminal 27 is connected to the memory 12 and to the signal processing circuit 25. The data interface 26 is connected to the signal processing circuit 25. The data interface 26 may be coupled via a bus line to a data terminal of the signal processing circuit 25. Moreover, a bus line may connect the data terminal 28 of the signal processing circuit 25 to the data terminal 29 of the memory 12. The signal processing circuit 25 and the signal evaluation circuit 14 may be fabricated on two separate dies.

Moreover, the card 10 comprises a reference potential terminal 30 that is connected via a ground connection line 31 to circuits such as e.g. the signal processing circuit 25. The data interface 26, the supply voltage terminal 27 and the reference potential terminal 30 are external terminals of the card 10. They are located at an edge of the card 10. The supply voltage terminal 27 is free of a connection or/and coupling to the antenna 11. The supply voltage terminal 27 does not receive electrical power via the antenna 11 and/or the energy supply circuit 14 in any phase. Optionally, the supply output 17 or further supply output 19 of the energy supply circuit 14 and the supply voltage terminal 27 may both be coupled via a power management circuit (not shown) to the supply input 20 of the memory 14.

Additionally, the card 10 comprises a further interface 35 that is coupled to the signal processing circuit 25. The further interface 35 is realized as a communication interface, for example as a bus communication interface. The further interface 35 may be an Ethernet, USB or RS485 interface. The further interface 35 has a bus terminal 36 that is connected to a data terminal 37 of the signal processing circuit 25 via a bus line. The bus terminal 36 may be named data bus terminal or data terminal. The supply voltage terminal 27 may be connected to the further interface 35.

Furthermore, the card 10 comprises a further memory 40. The further memory 40 is coupled to the signal evaluation circuit 25. Moreover, the further memory 40 is connected to the supply voltage terminal 27. A bus line may connect the further memory 40 to the signal processing circuit 25. The further memory 40 may be realized as a volatile memory. Alternatively, the further memory 40 is realized as a non-volatile memory. Further alternatively, the further memory 40 is partially realized as a volatile memory and partially realized as a non-volatile memory. The memory 40 may be fabricated as high power memory.

Figure 2A:
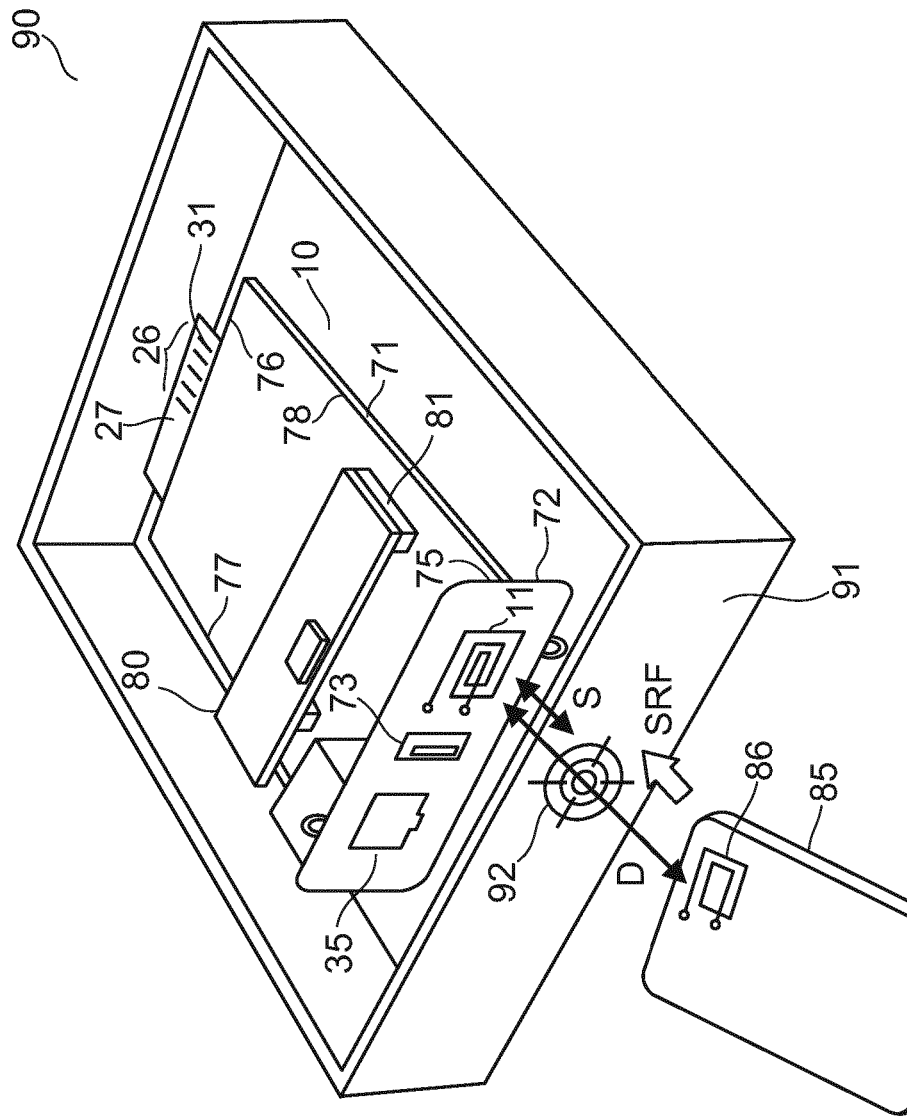
FIGS. 2A to 2C show exemplary embodiments of a system comprising a box with a communication card.
Figure 2B:
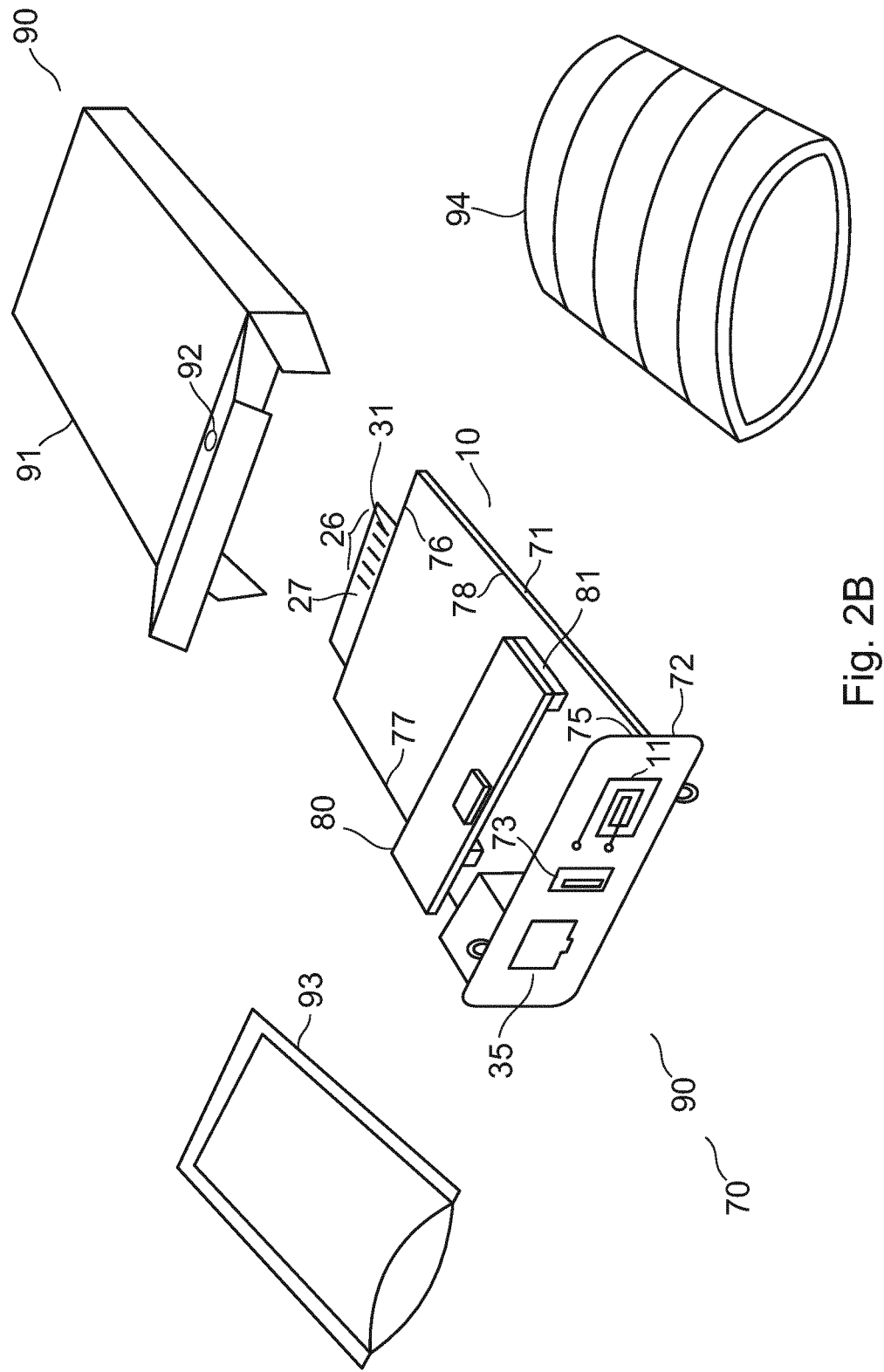

The card 10 can also be called "communication board". The card 10 can be realized on a printed circuit board. The signal processing circuit 25 is arranged on the printed circuit board. The signal processing circuit 25 may be realized as a microcontroller or microprocessor. The memory 12, the signal evaluation circuit 13 and the energy supply circuit 14 may be realized on a part 23 or section of the printed circuit board or on a further printed circuit board which is attached to the printed circuit board (e.g. as shown in FIGS. 2A and 2B).

An electromagnetic signal SRF is provided to the antenna 11. The electromagnetic signal SRF may be realized as a near-field-communication signal, abbreviated NFC signal. The electromagnetic signal SRF is received by the antenna 11 and applied to the energy supply circuit 14. The electromagnetic signal SRF generates an antenna voltage VA between the two terminals 15, 16 of the antenna 11. The energy supply circuit 14 generates an output voltage VOUT and provides it to the supply input 18 of the signal evaluation circuit 13. Moreover, the energy supply circuit 14 generates a further output voltage VOUT' and supplies it to the supply input 20 of the memory 12.

Alternatively, the output voltage VOUT and the further output voltage VOUT' are identical; the output voltage VOUT is provided to both the signal evaluation circuit 13 and to the memory 12.

The signal evaluation circuit 13 decodes the data provided in the electromagnetic signal SRF and provides this data via the data terminal 21 of the signal evaluation circuit 13 to the data terminal 22 of the memory 12. The memory 12 stores this data. This data may, for example, be configuration data of the card 10. The configuration data may include e.g. an internet protocol address (abbreviated IP address) of the card 10, a network parameter and/or a serial number of the card 10. The signal evaluation circuit 13 exchanges a data signal SDA with the memory 12. Thus, receiving data via the electromagnetic signal SRF and storing the data in the memory 12 is realized without a supply voltage VSU applied to the supply voltage terminal 27. The card 10 is designed to store data received via the electromagnetic signal SRF in the memory 12 without being inserted into an arrangement or without being supplied by a supply voltage VSU. The storage of data may be performed in a commissioning phase.

An operating phase follows the commissioning phase. In the operating phase, a supply voltage VSU is provided to the card 10 via the supply voltage terminal 27. The supply voltage VSU supplies the signal processing circuit 25 and the memory 12. The signal processing circuit 25 is designed to read the data of the memory 12 and, for example, to configure the card 10 using configuration data stored in the memory 12. The signal processing circuit 25 exchanges information via the data interface 26 to other (not shown) parts of an arrangement or equipment. The signal processing circuit 25 supplies a data signal SDATA to the data interface 26 using information gained via a further data signal SDA' received from the memory 12. Moreover, the signal processing circuit 25 exchanges an additional data signal SDATA' with the further interface 35. For example, the signal processing circuit 25 converts the additional data signal SDATA' received via the further interface 35 into the data signal SDATA and provides the data signal SDATA to the data interface 26 and vice versa. The signal processing circuit 25 exchanges an additional data signal SDATA" with the further memory 40.

In the case that the supply voltage VSU has the value of several volts, a mobile device (shown e.g. in FIGS. 2A, 2C and 3) having a further antenna can provide the electromagnetic signal SRF to the antenna 11 of the card 10. The mobile device is external with respect to the card 10 or an arrangement comprising the card 10. In this way data stored in the memory 12 can be provided via the signal evaluation circuit 13 and the antenna 11 to the mobile device. This data may be identification data, serial numbers, log data, history data, status data of the card 10 or data indicating a failure or error of the card 10 or of an arrangement comprising the card 10. Thus, in an evaluation phase after the operating phase or operating phases, information stored in the card 10 can be provided via the antenna 11 to the mobile device.

The signal evaluation circuit 13 is designed to store data into or to receive data from the memory 12 in the presence of the electromagnetic signal SRF. The signal processing circuit 25 is designed to store data into or receive data from the memory 12 in the presence and/or in the absence of the electromagnetic signal SRF. However, the operation of the signal processing circuit 25 is exclusively performed in the presence of the supply voltage VSU, whereas the supply voltage VSU has a value in a predetermined operating range.

FIG. 2A shows an exemplary embodiment of a system 70. The system 70 comprises the card 10 according to one of the embodiments shown in FIG. 1. The card 10 comprises a printed circuit board 71 and a panel 72. The panel 72 may be a front, rear or side panel. The antenna 11 is arranged at the panel 72. Moreover, the further interface 35 is located at the panel 72. The further interface 35 may be realized as an Ethernet port. The card 10 may comprise an additional interface 73 connected to the signal processing circuit 25. The additional interface 73 may be realized e.g. as universal-serial-bus port, abbreviated USB port.

The panel 72 is mechanically connected to the printed circuit board 71. A backside of the panel 72 is mechanically connected to the printed circuit board 71. The antenna 11 may be attached to the backside of the panel 72. Alternatively, the antenna 11 may be attached to a front side of the panel 72. Additionally, the panel 72 is electrically connected to the printed circuit board 71.

Figure 3:
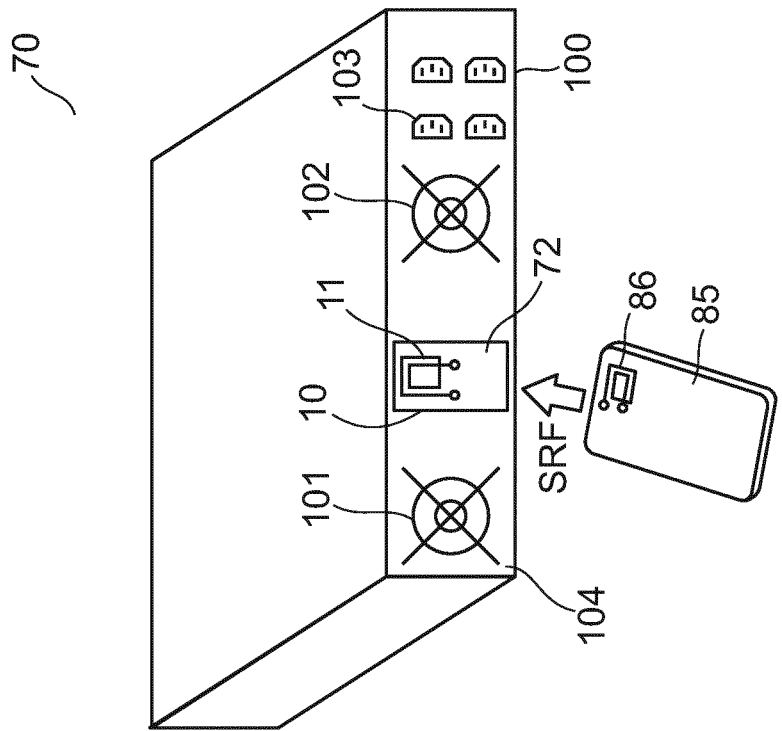
FIG. 3 shows an exemplary embodiment of a system with an arrangement including a communication card.

The printed circuit board 71 has a first to a fourth edge 75 to 78, a top side and a bottom side. The panel 72 is located at a first edge 75 of the printed circuit board 71. The data interface 26 and the supply voltage terminal 27 are located at a second edge 76 of the printed circuit board 71. The second edge 76 is opposite to the first edge 75. As can be seen in FIG. 2A, the printed circuit board 71 comprises conducting lines at the second edge 76. Thus, the card 10 is inserted in a slot of an arrangement (e.g. as shown in FIG. 3). These conduction lines are connected to a receiving part at the arrangement. The supply voltage terminal 27, the reference potential terminal 30 and the data interface 26 are realized by these conduction lines.

The card 10 may comprise a further printed circuit board 80 that is arranged in parallel to the printed circuit board 71. The further printed circuit board 80 is connected to the printed circuit board 71 via a socket 81. The circuits of the card 10 such as the memory 12, the signal evaluation circuit 13, the energy supply circuit 14, the signal processing circuit 25, the further memory 40 and further circuits are either realized on the printed circuit board 71 or on the further printed circuit board 80. The further printed circuit board 80 may optionally include the memory 12, the signal evaluation circuit 13 and the energy supply circuit 14 (realized on the part 23 shown in FIG. 1).

Moreover, the system 70 comprises a mobile device 85 that may be held by a hand. The mobile device 85 comprises a further antenna 86. The further antenna 86 may be a near-field-communication antenna. The mobile device 85 emits the electromagnetic signal SRF by the further antenna 86. In case the mobile device 85 is held in the vicinity of the antenna 11, a signal transfer from the further antenna 86 of the mobile device 85 to the antenna 11 of the card 10 can be achieved, for example in the commissioning phase. Additionally, a signal transfer from the card 10 to the mobile device 85 is also possible, for example, in the commissioning phase, in the operating phase and/or in the evaluation phase.

In FIG. 2A also an exemplary embodiment of a box 90 is shown. The box 90 is realized such that the card 10 can be inserted into the box 90. The box 90 has an outer housing 91. The outer housing 91 may be named packaging envelope. By a not shown separator or separators the card 10 is held in a predetermined position inside of the box 90. At the outside of the box 90 a mark 92 is provided. The mark 92 is located at the outside of the outer housing 91. The mark 92 is located at that location of the outside of the outer housing 91 which is in close vicinity to the antenna 11 of the card 10. The mark 92 is e.g. a printed target on the cardboard box 90 to facilitate the positioning of the mobile device 85.

A distance S is a predetermined or calibrated spacing between the antenna 11 of the card 10 and the outside of the outer housing 91. A distance D is the maximum antenna-to-antenna distance (about 2 cm as per NFC standard), strictly defined by how the card 10 is locked into the box 90 by the use of the separator or separators (that may be realized by calibrated spacers). Thus, the distance S may be out of an interval of 2 mm to 5 cm or alternatively 2 mm to 3 cm.

The box 90 also comprises a not shown cover that closes the box 90. The box 90 as shown in FIG. 2A and the additional cover are realized out of a non-conducting material, for example out of paper or paperboard. The box 90 may be fabricated as cardboard box. The mobile device 85 is realized as a smartphone or a tablet computer. The mobile device 85 comprises a software. The mobile device 85 can communicate by the further antenna 86 with the card 10 using the software on the mobile device 85.

Thus, a configuration or pre-configuration of the card 10 is achieved. The mobile device 85 performs an "in the box" customization of the card 10. The card 10 reacts on the electromagnetic signal SRF only in case of a small value of the distance D of the mobile device 85 to the card 10. Thus, a high safety is achieved that the card 10 receives the correct configuration data. Advantageously, no electrical power is required at the supply voltage terminal 27 during the commissioning phase or the evaluation phase. Advantageously, configuration data can be provided to the card 10 without manually setting DIP switches. No reference potential GND can be tapped at the reference potential terminal 30 and/or the ground connection line 31, in case the card 10 is in the box 90. No supply voltage VSU is tapped at the supply voltage terminal 27, in case the card 10 is in the box 90.

In an alternative embodiment, as shown in FIG. 1, the card 10 comprises exactly one printed circuit board, namely the printed circuit board 71. The devices attached to the further printed circuit board 80 are integrated on the printed circuit board 71.

In an alternative embodiment, not shown, the card 10 comprises a connector instead of the conducting lines at the second edge 76. The connector is a part to realize the data interface 26 and the supply voltage terminal 27.

FIG. 2B shows an alternative exemplary embodiment of a part of the system 70. The box 90 additionally comprises an antistatic cover 93. The card 10 can be inserted into the antistatic cover 93. The antistatic cover 93 can be named anti electro-static-discharge cover, abbreviated anti-ESD cover. Moreover, the box 90 comprises the separator 94. The separator 94 can fabricated using shock packaging material. The separator 94 may be realized e.g. as air cushions. The card 10 with the antistatic cover 93 is inserted into the separator 94. The card 10, together with the antistatic cover 93 and the separator 94, is inserted into the outer housing 91 of the box 90. The separator 94 is formed such that the antenna 11 of the card 10 is located in close vicinity to the mark 92 that is applied at the outside of the outer housing 91.

In an alternative embodiment, not shown, the antistatic cover 93 is omitted. Alternatively, the antistatic cover 93 has an opening of the antistatic material in the vicinity of the antenna 11.

Figure 2C:
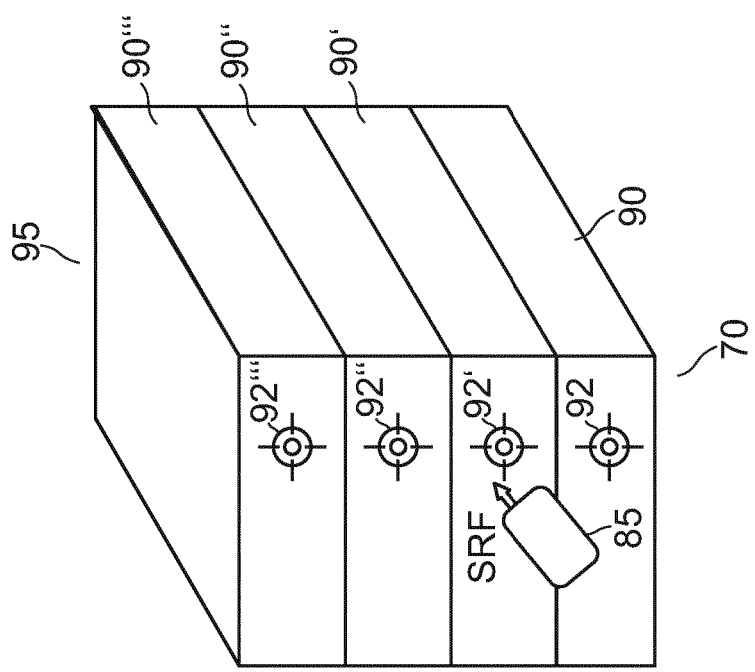

FIG. 2C shows an exemplary embodiment of a bundle box 95, comprising a first number N of boxes 90, 90', 90", 90'" as described above. The first number N of boxes 90, 90', 90", 90'" is larger than 1. The first number N may be e.g. larger than 2, 3, 5 or 10. Each of the first number N of boxes 90, 90', 90", 90'" has a mark 92, 92', 92", 92'". Thus, the bundle box includes a first number N of marks 92, 92', 92", 92'". The marks 92, 92', 92", 92'" are at identical positions at the boxes 90, 90', 90", 90'".

Advantageously, the communication cards 10 inside the bundle box 95 can individually receive their configuration data before installation an arrangement (such as shown in FIG. 3). Advantageously, it is possible to perform a commissioning of the card 10 while the card 10 is in its card board box 90. It is not required that the card 10 is powered via a regular power supply. The card 10 does not embed any native HMI.

FIG. 3 shows an alternative embodiment of the system 70 with the card 10 which is a further development of the above shown embodiments. The system 70 comprises the mobile device 85 and an arrangement 100. The card 10 is a part of the arrangement 100. The arrangement 100 may be realized as an uninterruptible power supply (abbreviated UPS) or as a power distribution unit (abbreviated PDU). The arrangement 100 may be realized as an equipment. In the example shown in FIG. 3, the card 10 is inserted into the arrangement 100. The card 10 is introduced into a not shown slot or slit of the arrangement 100. The card 10 is inserted at one side of the arrangement 100. At this side of the arrangement 100, also other parts of the arrangement 100 may be located such as e.g. at least one socket 103, a first fan 101 and/or a second fan 102. The arrangement 100 has a rear side 104. The card 10 is inserted into the rear side 104. The panel 72 closes the side of the arrangement 100. In this example, the panel 72 is a rear panel.

The card 10 is installed into the equipment 100, powered or unpowered. The same card 10 can be used in the system 70 shown in FIGS. 2A to 2C and in the system 70 shown in FIG. 3. The card 10 which already is inserted into the arrangement 100 can receive its configuration data (alternatively, the packaged card 10 as shown in FIGS. 2A and 2C can receive its configuration data).

Further ways of operation are possible: The arrangement 100 can be in the operating phase. Thus, the supply voltage VSU is provided to the supply voltage terminal 27. The mobile device 85 can communicate with the arrangement 100 using the antenna 11 of the card 10 in the operating phase. The supply voltage terminal 27 receives electrical power from a power supply of the arrangement 100 in the operating phase, but not in the commissioning phase.

Alternatively, the arrangement 100 can be in the evaluation phase. In the evaluation phase, there may be a failure inside the arrangement 100. Alternatively, the supply voltage VSU has a value of zero or another value which is too low for operation. Thus, the arrangement 100 is idle in the evaluation phase. The signal processing circuit 25 is idle in the evaluation phase. The mobile device 85 can receive data stored in the memory 12 in the evaluation phase. Thus, the status of the arrangement 100 and information about previous states which may be stored in a history log in the memory 12 can be provided from the card 10 to the mobile device 85.

The embodiments shown in FIGS. 1 to 3 as stated represent example embodiments of the improved communication card, arrangement, box and bundle box; therefore, they do not constitute a complete list of all embodiments according to the improved communication card, arrangement with communication card, box and bundle box. Actual communication cards, arrangements, boxes and bundle boxes may vary from the embodiments shown in terms of parts, structures and shape, for example.

| Reference Numerals | |
| --- | --- |
| 10 | communication card |
| 11 | antenna |
| 12 | memory |
| 13 | signal evaluation circuit |
| 14 | energy supply circuit |
| 15, 16 | terminal |
| 17 | supply output |
| 18 | supply input |
| 19 | further supply output |
| 20 | supply input |
| 21, 22 | data terminal |
| 23 | part |
| 25 | signal processing circuit |
| 26 | data interface |
| 27 | supply voltage terminal |
| 28, 29 | data terminal |
| 30 | reference potential terminal |
| 31 | ground connection line |
| 35 | further interface |
| 36 | bus terminal |
| 37 | data terminal |
| 40 | further memory |
| 50 | capacitor |
| 51 | demodulator |
| 52 | logic circuit |
| 53 | modulator switch |
| 55 | rectifier |
| 56 | regulator |
| 57 | power management circuit |
| 58, 59 | buffer capacitor |
| 70 | system |
| 71 | printed circuit board |
| 72 | panel |
| 73 | additional interface |
| 75 to 78 | edge |
| 80 | further printed circuit board |
| 81 | socket |
| 85 | mobile device |
| 86 | further antenna |
| 90, 90', 90", 90'" | box |
| 91 | outer housing |
| 92, 92', 92", 92'" | mark |
| 93 | electrostatic cover |
| 94 | separator |
| 95 | bundle box |
| 100 | arrangement |
| 101, 102 | fan |
| 103 | socket |
| 104 | rear side |
| D | distance |
| GND | reference potential |
| S | distance |
| SDA, SDA' | data signal |
| SDATA, SDATA', SDATA" | data signal |
| SDE | demodulated signal |
| SO | output signal |
| SRF | electromagnetic signal |
| VA | antenna voltage |
| VOUT, VOUT' | output voltage |
| VR | rectified voltage |
| VRE | regulated voltage |
| VSU | supply voltage |

The invention claimed is:

1. A communication card, comprising
an antenna,
a memory, being realized as a non-volatile memory,
a signal evaluation circuit, coupled to the antenna and to the memory,
an energy supply circuit, coupled to the antenna, the signal evaluation circuit and the memory,
a data interface,
a signal processing circuit coupled to the data interface and to the memory,
a supply voltage terminal coupled to the signal processing circuit and to the memory,
a printed circuit board, wherein the data interface, the signal processing circuit and the supply voltage terminal are located at the printed circuit board,
a panel that is mechanically and electrically connected to the printed circuit board, wherein the antenna is located at the panel, and
a further interface that is realized as communication interface, is coupled to the signal processing circuit and is located at the panel,
wherein in a commissioning phase, the energy supply circuit is configured to receive electrical power via the antenna and to provide electrical power to the signal evaluation circuit and the memory, and the signal evaluation circuit is configured to receive configuration data via the antenna and to store the configuration data in the memory, and
wherein in an operating phase, the communication card is configured to receive electrical power by the supply voltage terminal, and the signal processing circuit is configured to read the configuration data stored in the memory.

2. The communication card according to claim 1,
wherein the antenna is implemented as a near-field-communication antenna.

3. The communication card according to claim 1,
wherein the energy supply circuit is configured for energy harvesting of energy provided by the antenna.

4. The communication card according to claim 1,
wherein the signal evaluation circuit is configured for data decoding of signals provided via the antenna to the signal evaluation circuit and for data encoding of signals provided from the signal evaluation circuit to the antenna.

5. The communication card according to claim 1,
wherein the communication card does not receive electrical power in the commissioning phase by the supply voltage terminal.

6. The communication card according to claim 1,
wherein the signal processing circuit is configured to store data in the memory in the operating phase,
wherein the signal evaluation circuit is configured to provide the data via the antenna in an evaluation phase that follows the operating phase, and
wherein the communication card does not receive electrical power in the evaluation phase by the supply voltage terminal.

7. The communication card according to claim 1,
wherein the communication card comprises a further memory and is coupled to the signal processing unit and to the supply voltage terminal.

8. The communication card according to claim 1,
wherein the configuration data include at least one data of a group comprising network description data, network identification data, internet-protocol address and host name.

9. An arrangement,
wherein the arrangement comprises the communication card of claim 1 and a slot,
wherein the arrangement is one of a group comprising an uninterruptable power supply and a power distribution unit, and
wherein the communication card is inserted into the slot.

10. The arrangement according to claim 9,
wherein the communication card is configured as plug-in card.

11. A system, comprising:
a communication card; and
a box,
wherein the box comprises:
an outer housing,
a mark at a location at an outer side of the outer housing, and
at least one separator inside the outer housing and being configured such that the communication card can be inserted into the box, wherein the at least one separator is configured to hold the communication card in a predetermined position such that an antenna of the communication card is arranged within the box at a position adjacent to the mark.

12. The system according to claim 11,
wherein the communication card comprises an energy supply circuit, a memory and a signal evaluation circuit, and
wherein in a commissioning phase, the energy supply circuit is configured to receive electrical power via the antenna through the outer housing and to provide electrical power to the signal evaluation circuit and the memory, and the signal evaluation circuit is configured to receive configuration data via the antenna through the outer housing and to store the configuration data in the memory.

13. The system according to claim 11,
wherein the antenna is implemented as a near-field-communication antenna.

14. The system according to claim 11, comprising a bundle box,
wherein the bundle box comprises a first number N of boxes with the first number N>1, wherein each of the first number N of boxes comprises a mark.

15. A method performed by a communication card, the communication card comprising:
an antenna,
a memory, being realized as a non-volatile memory,
a signal evaluation circuit, coupled to the antenna and to the memory,
an energy supply circuit, coupled to the antenna, the signal evaluation circuit and the memory,
a data interface,
a signal processing circuit coupled to the data interface and to the memory,
a supply voltage terminal coupled to the signal processing circuit and to the memory,
a printed circuit board, wherein the data interface, the signal processing circuit and the supply voltage terminal are located at the printed circuit board,
a panel that is mechanically and electrically connected to the printed circuit board, wherein the antenna is located at the panel, and a further interface that is realized as communication interface, is coupled to the signal processing circuit and is located at the panel, the method comprising:
receiving by the energy supply circuit, in a commissioning phase, electrical power via the antenna and providing electrical power to the signal evaluation circuit and the memory;

receiving by the signal evaluation circuit, during the commissioning phase, configuration data via the antenna and storing the configuration data in the memory; and receiving by the supply voltage terminal, during an operating phase, electrical power, and reading by the signal processing circuit, during the operating phase, the configuration data stored in the memory.

* * * * *